UNITED STATES PATENT OFFICE.

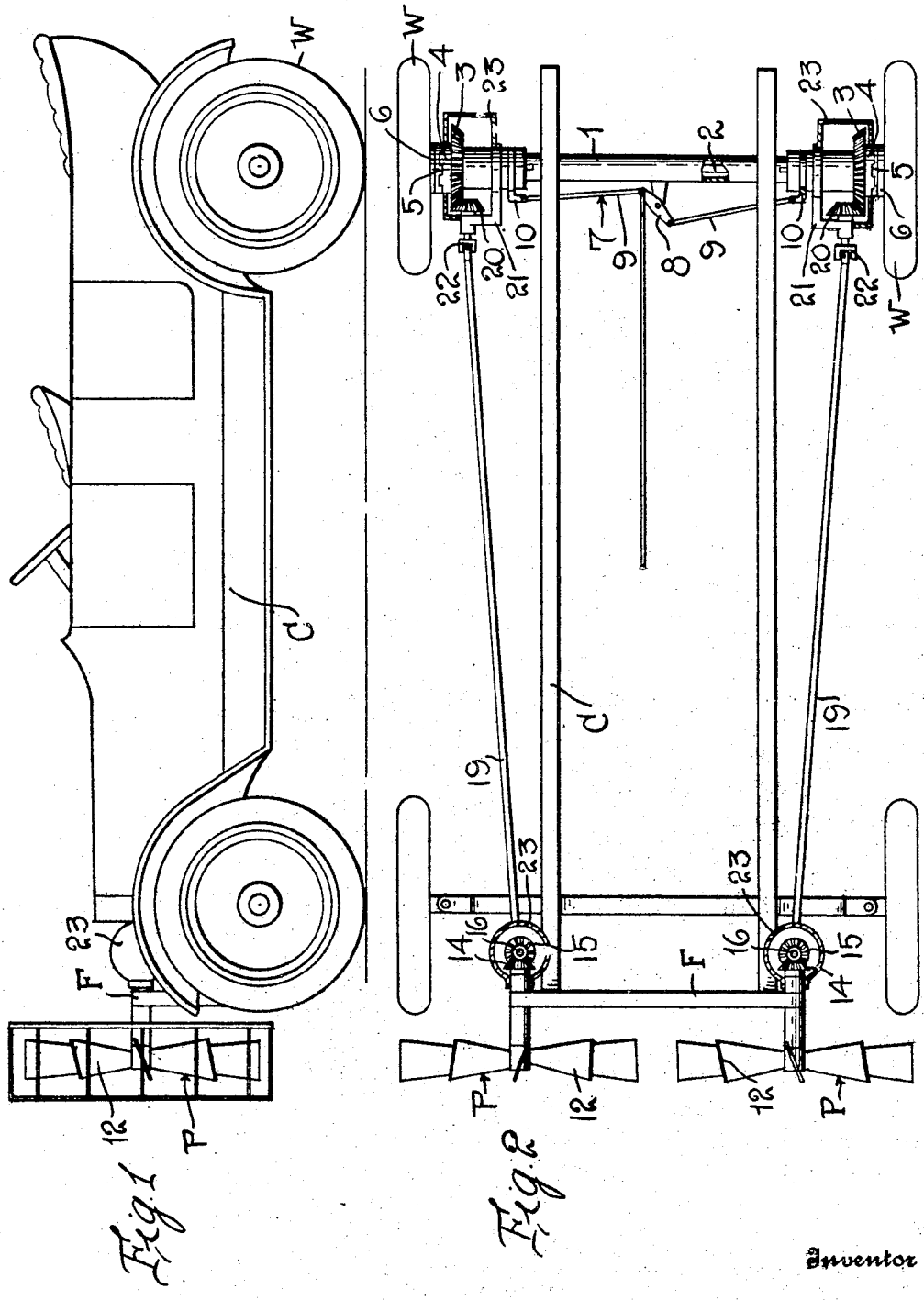

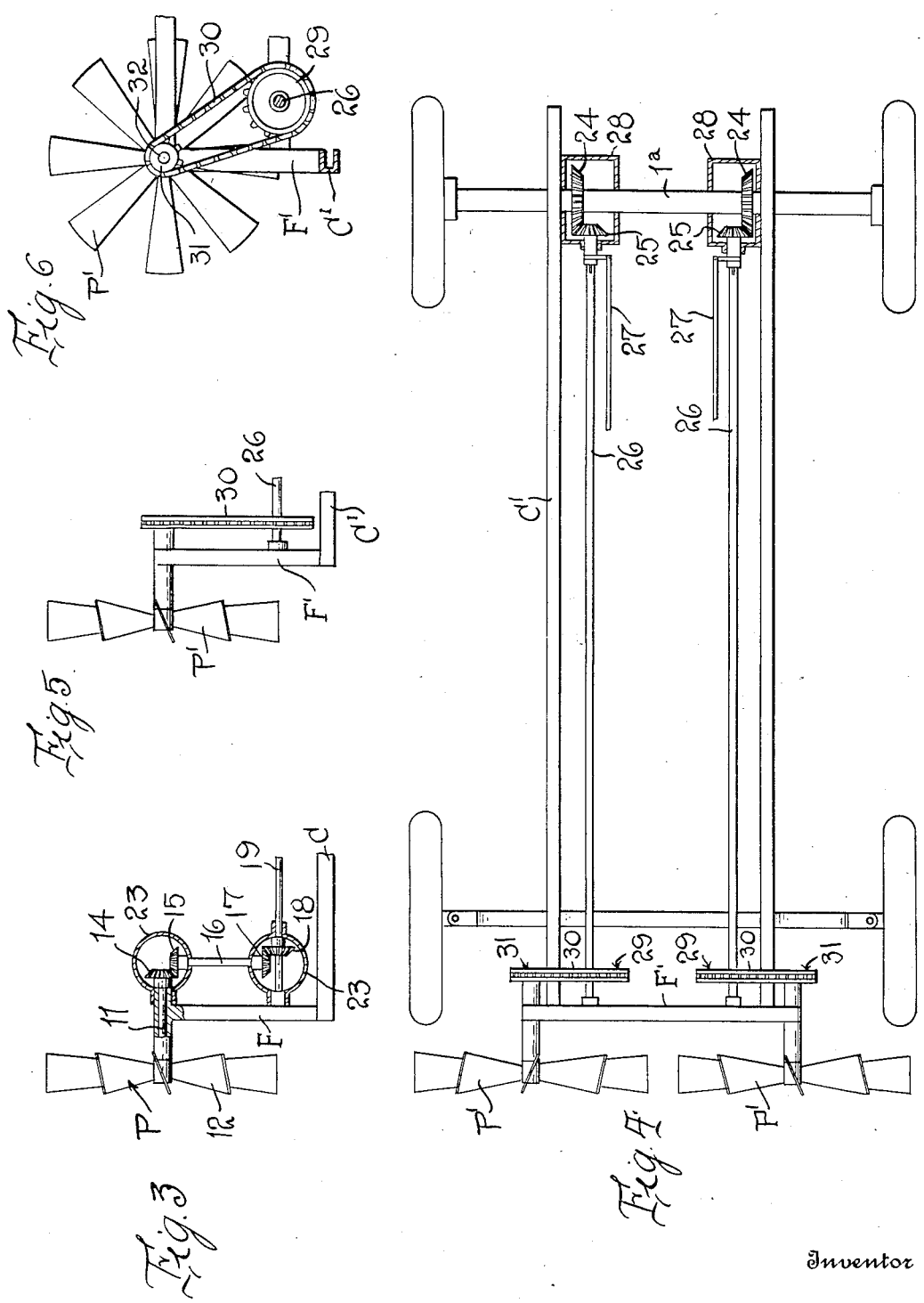

EDWARD G. WINTERMUTE, OF EXETER, NEBRASKA.

MOTOR-DRIVEN VEHICLE.

1,198,501.  Specification of Letters Patent.  Patented Sept. 19, 1916.

Application filed March 11, 1916. Serial No. 83,680.

*To all whom it may concern:*

Be it known that I, EDWARD G. WINTERMUTE, a citizen of the United States, residing at Exeter, in the county of Fillmore and State of Nebraska, have invented certain new and useful Improvements in Motor-Driven Vehicles, of which the following is a specification, reference being had to the accompanying drawings.

This invention relates to certain improvements in motor-driven vehicles and it is an object of the invention to provide novel and improved means wherein is employed mechanism coacting with atmospheric resistance.

Furthermore it is an object of my invention to provide a novel and improved driving means for a vehicle wherein one or more propellers are positioned in advance of the vehicle and operatively engaged with the driven shaft thereof.

Furthermore the invention has for an object to provide a novel and improved driving means whereby the speed of the vehicle may be increased or accelerated through the medium of a rotating propeller acting on the atmosphere and thereby augmenting the propulsion power applied to the driving wheels of the vehicle, while at the same time lessening the jar or vibration of the vehicle and also affording a maximum of mileage with a minimum consumption of fuel.

The invention consists in the details of construction and in the combination and arrangement of the several parts of my improved vehicle whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in side elevation illustrating a vehicle having a propelling means constructed in accordance with an embodiment of my invention applied thereto; Fig. 2 is a view in plan illustrating my operating mechanism as embodied in Fig. 1; Fig. 3 is a fragmentary vertical sectional view illustrating the operative connection between the driving shaft and one of the propellers; Fig. 4 is a view in plan illustrating a further embodiment of my invention; Fig. 5 is a fragmentary view in elevation illustrating the operative connection between the driving shaft and a propeller as included in the second form of my invention; and Fig. 6 is a view in front elevation of the structure shown in Fig. 5.

As herein disclosed, C denotes the chassis of a motor-driven vehicle with which is operatively engaged in a conventional manner the casing 1 through which the rear or drive axle 2 is disposed, said axle having affixed thereto in any desired manner the rear or drive wheels W. The axle 2 is also operatively engaged in any ordinary or preferred manner with a suitable motor (not shown).

Slidably mounted upon the end portions of the casing 1 are the bevel-gears 3 each of which being provided with a clutch face 4 adapted to coact with a clutch face 5 formed on the inner ends of the hub 6 of the adjacent wheel W. Coacting with the gears 3 is an operating mechanism 7 adapted to move the gears toward or from the hubs 6 of the wheels W whereby said gears 3 may be caused to rotate in unison with the wheels W when desired.

As herein embodied, the operating means for sliding the gears 3 comprises a lever 8 pivotally supported intermediate its length for rocking movement and having operatively engaged with its opposite ends the levers 9 also operatively engaged with the gears 3 or more particularly the hubs thereof, as indicated at 10.

The forward end of the chassis C is provided with an upstanding and transversely disposed frame F having rotatably mounted in its upper portion and adjacent the opposite sides of the chassis C, the forwardly directed substantially horizontally disposed shafts 11 to the forward ends of which are secured the propellers P preferably forty-two inches in diameter and having the blades 12 thereof arranged on a predetermined plane.

The inner end portions of the shafts 11 are provided with the bevel-gears 14 in mesh with the bevel-gears 15 carried by the upper extremities of the vertically disposed shaft 16 rotatably supported by the frame F, and the lower ends of said shafts 16 are provided with the bevel-gears 17 in mesh with the bevel-gears 18 affixed to the forward ends of the shafts 19 arranged longitudinally of the chassis C and having their rear extremities provided with the bevel-gears 20 in mesh with the gears 3, hereinbefore referred to, and said gears 3 and 20 are maintained constantly in mesh through the medium of the brackets 21 and it is to be understood that the shafts 19 have interposed therein a universal joint 22 whereby no obstruction or hindrance will be offered by the shafts 19 to the adjustments or movements of the gears 3 relative to the hubs 6 of the wheels W.

It is to be noted that the meshing gears are arranged within a casing 23 adapted to be filled with hard oil or other lubricant for a purpose which is believed to be clearly apparent to those skilled in the art to which my invention appertains.

In the form of invention illustrated in Figs. 4, 5 and 6 the drive or rear axle 1ª has affixed thereto intermediate its length the bevel-gears 24 adapted to be engaged by the bevel-gears 25 slidably mounted upon the shafts 26 extending forwardly of the chassis C', said gears 25 being keyed to rotate with the shafts 26 but capable of movement longitudinally thereof under the influence of the operating mechanism 27, whereby the shafts 26 will be caused to rotate when the gears 25 are in mesh with the gears 24. It is also to be observed that the gears 24 and 25 are inclosed within a casing 28 also adapted to be filled with hard oil or other lubricant. The forward end of each of the shafts 26 has affixed thereto a sprocket wheel 29 around which is disposed a sprocket chain 30 also directed around the sprocket 31 fixed to a shaft 32 to the forward end of which a propeller P' is secured, said shaft 32 being rotatably supported by a frame F' carried by the forward end of the chassis C'.

From the foregoing description, it is thought to be obvious that a vehicle constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. In combination with the driving shaft of a motor-driven vehicle, a horizontally disposed shaft supported by the forward portion of the vehicle, a propeller secured to said shaft, a shaft disposed longitudinally of the vehicle, the forward extremity of the shaft being operatively engaged with the horizontal shaft and the rear extremity of the shaft being provided with means whereby the same may be operatively engaged with the driving axle of the vehicle, and means for detachably engaging said longitudinally disposed shaft with the driving axle.

2. In combination with a motor-driven vehicle and its driving axle, a gear fixed thereto, an air propeller carried by the vehicle, a shaft operatively engaged with the propeller, a gear slidably mounted upon the shaft, and means for moving said last named gear into or out of engagement with the first named gear.

In testimony whereof I hereunto affix my signature in the presence of two witnesses.

EDWARD G. WINTERMUTE.

Witnesses:
 MAUDE E. STRINGFIELD,
 E. J. DEMPSTER.